(12) United States Patent
DeMarinis et al.

(10) Patent No.: US 6,444,602 B1
(45) Date of Patent: *Sep. 3, 2002

(54) STRUCTURES AND METHODS OF MANUFACTURE FOR GAS DIFFUSION ELECTRODES AND ELECTRODE COMPONENTS

(75) Inventors: Michael DeMarinis, Upton; Emory S. De Castro, Nahant; Robert J. Allen, Saugus; Khaleda Shaikh, Woburn, all of MA (US)

(73) Assignee: DeNora S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/715,458

(22) Filed: Nov. 14, 2000

Related U.S. Application Data

(62) Division of application No. 09/585,124, filed on Jun. 1, 2000, now Pat. No. 6,368,476, which is a continuation of application No. 09/184,089, filed on Oct. 30, 1998, now Pat. No. 6,103,077.
(60) Provisional application No. 60/070,342, filed on Jan. 2, 1998.

(51) Int. Cl.$^7$ ................................................ H01M 4/88
(52) U.S. Cl. ....................... 502/101; 204/282; 204/284; 204/290.07; 204/290.14; 204/294; 429/40; 429/42; 429/44
(58) Field of Search .................... 502/101; 204/290.07, 204/282, 284, 294, 290.14; 429/40, 42, 44

(56) References Cited

U.S. PATENT DOCUMENTS 6,103,077 A * 1/2000 Demarinis et al. .......... 204/284

* cited by examiner

*Primary Examiner*—Bruce F. Bell
(74) *Attorney, Agent, or Firm*—Bierman, Muserlian and Lucas

(57) ABSTRACT

Gas Diffusion Electrodes (GDEs) play a pivotal role in clean energy production as well as in electrochemical processes and sensors. These gas-consuming electrodes are typically designed for liquid electrolyte systems such as phosphoric acid and alkaline fuel cells, and are commercially manufactured by hand or in a batch process. However, GDEs using the new electrolytes such as conductive polymer membranes demand improved electrode structures.

This invention pertains to GDEs and gas diffusion media with new structures for systems using membrane electrode assemblies (MEAs), and automated methods of manufacture that lend themselves to continuous mass production. Unexpected improvements in gas and vapor transport through the electrode are realized by incorporating a new dispersion process in the construction, reformulating the applied mix with solution additives, and creating a novel coating structure on a conductive web. Furthermore, combining these changes with a judicious choice in coating methodology allows one to produce these materials in a continuous automated fashion.

12 Claims, 11 Drawing Sheets

STRUCTURES AND METHODS OF MANUFACTURE FOR GAS DIFFUSION ELECTRODES AND ELECTRODE COMPONENTS

PRIOR APPLICATIONS

This application is a division of U.S. patent application Ser. No. 09/585,124 filed Jun. 1, 2000, now U.S. Pat. No. 6,368,476, which is a continuation of U.S. patent application Ser. No. 09/184,089 filed Oct. 30, 1998, now U.S. Pat. No. 6,103,077 which is based on provisional application Ser. No. 60/079,342 filed Jan. 2, 1998.

A gas diffusion electrode (GDE) consumes or is depolarized by a gas feed while allowing direct electronic transfer between the solid and gas phase. Together with the electrolyte, the GDE provides a path for ionic transfer, which is just as critical. GDEs are typically constructed from a conductive support, such as a metal mesh, carbon cloth, or carbon paper. This support is often called a web. The web is coated with hydrophobic wet-proofing layers, and finally, a catalytic layer is applied most commonly to one face. While the catalytic layer can consist of very fine particles of a precious metal mixed with a binder, many employ the methods similar to that in Petrow, et al., U.S. Pat. No. 4,082,699. This patent teaches the use of using finely divided carbon particles such as carbon black as the substrate for small (tens of angstroms) particles of the nobel metal. Thus called a "supported" catalyst, this methodology has shown superior performance and utilization of the catalyst in electrochemical applications. However, the application of this supported catalyst as well as wet proofing layers to the web engages the need for a well-dispersed mix.

Often, GDEs are cited as key components in Fuel Cells. Here, the anode is typically depolarized with hydrogen while the cathode is depolarized with oxygen or air. The resulting products are energy in the form of electricity, some heat, and water. Examples of acid or alkaline fuel cells are well known. However, some have also realized that the energy-producing quality of a fuel cell can be adapted to industrial electrochemical processes and thus save energy and hence reduce operating costs.

GDEs also may allow the creation of a commodity directly from a gaseous feedstock. For example, Foller, et al. (The Fifth International Forum on Electrolysis in the Chemical Industry, Nov. 10–14, 1991, Fort Lauderdale, Fla., Sponsored by the Electrosynthesis Co., Inc.) describe the use of a GDE to create a 5 wt. % hydrogen peroxide in caustic. In this case, oxygen is the feedstock and a specific carbon black (without noble metals) is the feedstock and a specific carbon black (without noble metals) is the catalyst. A typical chlor-alkali cell uses two solid electrodes to produce sodium hydroxide and chlorine. In this case, both the anode and cathode expend energy to evolve gas, and special measures are taken to keep the resulting hydrogen away from the chlorine due to a potentially explosive mixture. The typical chlor-alkali cathode can be replaced with an oxygen-depolarized cathode, as has been shown by Miles et al. in U.S. Pat. No. 4,578,159 and others. A cell run in such a manner saves approximately one volt, and the hydrogen/chlorine problem is eliminated. Aqueous hydrochloric acid is an abundant chemical by-product. One can recover the high-value chlorine by oxidizing solutions of HCl, and thus recycle the chlorine as a feedstock to the chemical plant.

Electrolysis becomes extremely attractive when the standard hydrogen-evolving cathode is substituted with an oxygen-consuming gas diffusion electrode due to the significant drop in energy consumption. The ability of the gas diffusion electrode to operate successfully in this and the preceding examples is acutely dependent on the structure of the gas diffusion electrode: for in all these cases, the electrode serves as a zone for liquid-gas-solid contact, as a current distributor, and most importantly, as a liquid barrier. The use of solid polymer electrolytes has greatly expanded the field of electrochemistry. As summarized above, electrochemical processes depend on the transfer of ionic and electronic charge through the use of an anode, cathode, and an ionic liquid electrolyte. However, with the advent of the solid polymer electrolyte fuel cell, the traditional liquid phase has been replaced with a membrane composed of a polymer electrolyte that transfers ionic charge under typical electrolytic conditions. One can deposit a catalyst layer directly on the membrane, or attach a gas diffusion electrode to one or both faces of the conducting membrane. Such an assembly can be called a membrane electrode assembly (MEA), or for fuel cell applications, a PEMFC (proton exchange membrane fuel cell).

These solid polymer electrolytes are often composed of ion-conducting membranes that are commercially available. For example, in addition to the previously mentioned Nafion (a cation exchange membrane), Asahi Chemical and Asahi Glass make perfluorinated cation exchange membranes whereby the ion exchange group(s) are carboxylic acid/sulfonic acid of carboxylic acid. These companies produce cation exchange membranes with only the immobilized sulfonic acid group as well. Non-perfluorinated ion exchange membranes are available through Raipore (Hauppauge, N.Y.) and other distributors such as The Electrosynthesis Co., Inc. (Lancaster, N.Y.). Anion exchange membranes typically employ a quaternary amine on a polymeric support and are commercially available as well.

Nafion is typically employed in some fuel cells. For the hydrogen/air ($O_2$) fuel cell, hydrogen and oxygen are fed directly to the anode and cathode respectively, and electricity is generated. For these "gas breathing" electrodes to perform, the gas diffusion electrode structure must be highly porous to allow three phase contact between the solid electrode, the gaseous reactant, and the liquid or near liquid electrolyte. In addition to providing a zone for three-phase contact, the gas diffusion electrode structure aids in making electrical contact to the catalyst, enhances transport of reactant gasses into the zone, and provides for facile transport of product away from the zone (e.g. water vapor).

In addition to a gaseous hydrogen fuel and gaseous air ($O_2$) oxidant, others employ a mixed phase system such as the methanol/air($O_2$) fuel cell. Here, liquid methanol is oxidized at the anode while oxygen is reduced at the cathode. Another utilization for ion-conducting membranes and gas diffusion electrodes includes the electrochemical generation of pure gasses (for example see Fujita et al. in *Journal of Applied Electrochemistry*. vol. 16, page 935, (1986), electro-organic systhesis [for example see Fedkiw et al. in *Journal of the Electrochemical Society*, vol. 137, no. 5, page 1451 (1990)], or as transducers in gas sensors [for example see Mayo et al. in *Analytical Chimica Acta*, vol. 310, page 139, (1995)].

Typically, these electrode/ion-conducting membrane systems are constructed by forcing the electrode against the ion conducting membrane. U.S. Pat. No. 4,272,353, No. 3,134,697; and No. 4,364,813 all disclose mechanical methods of holding electrodes against the conducting membrane. However, the effectiveness of a mechanical method for intimately contacting the electrode to the polymer membrane electrolyte may be limited since the conducting membrane can frequently change dimensions with alterations in hydration and temperature. Swelling or shrinking can alter the degree of mechanical contact.

Thus, an alternative method of contacting the electrodes with the polymer membrane electrolyte involves direct deposition of a thin electrode onto one or both sides of the conducting polymer substrate. Nagel et al. in U.S. Pat. No. 4,326,930 disclose a method for electrochemically depositing platinum onto Nafion. Others have employed chemical methods whereby a metal salt is reduced within the polymer membrane [for example see Fedkiw et al. in *Journal of the Electrochemical Society*, vol. 139, no. 1, page 15 (1192)].

In both the chemical and electrochemical methods, one essentially precipitates the metal onto the ion conducting membrane. This precipitation can be difficult to control due to the nature of the ion-conducting polymer membrane, the form of the metal salt, and the specific method employed to precipitate the metal. As the goal of a thin, porous, and uniform metal layer is often not met via precipitation, practitioners have turned to other deposition methods. For example, ion beam assisted deposition techniques are disclosed in co-pending provisional patent application by Allen et al. (Ser. No. 60/035,999); a method for coating the membrane with an ink composed of the supported catalyst and solvent is disclosed by Wilson and Gottesfeld in the Journal of the Electrochemical Society, volume 139, page L28, 1992; and a method of using a decal to deposit a thin layer of catalyst onto the ion-conducting membrane is summarized by Wilson et al. in Electrochimica Acta, volume 40, page 355, 1995. Thus, these approaches differ from the previous strategy by the catalyst layer being deposited onto the ion conducting membrane, and a gas diffusion structure is subsequently placed against this catalyst layer.

Regardless of whether the catalyst is fixed to the membrane, or coated onto an uncatalyzed gas diffusion electrode and then bonded to the membrane via mechenical, and/or thermal means, the structure and composition of the component contacting the catalyst contributes to the overall MEA performance. This component is variously called a "diffuser", an electrode "backing", "gas diffusion media", a "gas diffusion layer", or an "uncatalyzed gas diffusion electrode" and can predominate MEA performance during operation at high current density. We will use the term diffuser to encompass all these synomyms. A diffuser is a material that: 1) provides electrical contact between the catalyst and the electrochemical cell current collector, 2) distributes and facilitates efficient transport of feed gas or gasses to the electrode, and 3) becomes a conduit for rapid transport of product(s) from the electrode. Thus the electrode is the catalytic layer or zone characterized by a three-phase interface of solid, liquid, and gas whereas the diffuser is a two-phase structure for gaseous (or liquid) transport and electrical contact.

There are a few commercial providers for diffusers. Gore Associates (Elkton, Md.) offer Carbel™, a conductive, microporous polymer. E-TEK, Inc. (Natick, Mass.) offers uncatalyzed versions of the gas diffusion electrodes found in their catalog. Of these, the uncatalyzed ELAT™ is listed as the best material for MEA applications. The gas diffusion electrode structure designed for providing a three-phase zone, current contact, and a liquid barrier is being adopted for MEA applications.

Typical ELAT construction is detailed in U.S. Pat. No. 4,293,396 by Allen et al. Here, a carbon cloth serves as the web. Carbon black is prepared for application to the carbon web by using techniques listed in U.S. Pat. No. 4,166,143 whereby solutions of Vulcan XC-72 or Shawinigan acetylene black (SAB) are mixed with water, ultrasonically dispersed with a sonic horn, mixed with Teflon® (TFE), and filtered. Layers of SAB mix serve as the wetproofing layer on each side of the web. Finally, layers of (catalyzed) Vulcan mix are coated onto one side of the assembly. Although the importance of mix penetration into the web is discussed, the actual coating method is not disclosed. The reported products were of limited lot size, so may have been individually prepared. After the final coat, the assembly may be sintered in air at a temperature sufficient to cause the Teflon to flow, typically 300–350° C. This double sided structure was designed with the intent to create an electrode that both achieves good gas distribution and contact with the catalyst while providing a hydrophobic barrier to prevent electrolyte transport completely through the electrode. Regardless, no information is relayed as to how this structure could be produced with economical means.

Similarly, a typical ink application is described by Ralph et. al. in the Journal of the Electrochemical Society, Vol. 144, page 3845, 1997 and references therein. Here, the goal is to minimize platinum usage. A gas diffusion electrode is constructed by using silk screen technology to coat a carbon paper web. The ink is comprised of catalyzed carbon black and binders including Teflon. The authors claim a resulting electrode structure comparable to that described by wilson and Gottesfeld or Wilson et al. cited previously above. If GDEs and ion conducting membranes are to be used in large volume, commercial processes such as power generation in electric vehicles, then one must meet a significant reduction in component cost. Thus, while the authors endorse the need for inexpensive manufacturing processes, they describe a batch coating design, which inherently limits product throughput.

In both the ink and mix preparation methods, it is generally accepted that the ultrasonic horn serves an important role in dispersing the carbon in solvent. Since the carbons are high surface area substances, it is important to prepare a uniform and stable suspension. Carbon blacks do not "wetout" without a significant input of energy or shear into the solution. Some also modify the solution with additives as well to induce high shear. The ultrasonic horn performs this function of wetting-out by way of high frequency electrical energy directed from a stainless steal tip immersed in the solution. The action of the horn generates pressure waves through the vessel and produces high shear through cavitation. Although suitable for limited production runs or R&D sized samples, there are several limitations to ultrasound. First, since the energy is projected from a single source, i.e., the horn, the power is a function of the distance from the horn, and will diminish significantly as one moves away. Second, as the action of the carbon black on the horn leads to abrasion and accelerated corrosion, the projected power spectrum emanating from the horn changes in time. For these reasons, ultrasound may not be appropriate for production of large quantities of diffusers.

With the rise of PEMFCs as suitable clean power sources, and the parallel increase in the use of MEAs in industrial and sensor applications, there is a need for a diffuser tailored for these materials. The current diffuser technology employs structures that were originally designed for liquid electrolyte systems. In addition, the current routine use of the sonic horn produces carbon black dispersions for coating that may be non-uniform and difficult to control for production of large batches of diffuser. Furthermore, the current manufacturing methodology is limited in its applicability to continuously coating a web—a step believed to be crucial in producing an inexpensive product.

OBJECTS OF THE INVENTION

It is an object of this invention to provide improved diffuser structures with transport properties for MEA type electrodes.

It is a further object of this invention to introduce a method of manufacture that is compatible with continuous automation.

It is a still further object of the invention to introduce a dispersion methodology that provides an unexpected increase in performance from diffusers and gas diffusion electrodes fabricated from carbon blacks preparing using this technique.

These and other objects and advantages of the invention will become obvious from the following detailed description.

THE INVENTION

The novel gas diffusion electrode of the invention comprises an electrically conductive web provided on at least one side with a wet-proofing layer of a suitable polymer provided with an electrocatalyst thereon. The electrically conductive web is preferably a carbon cloth web or carbon paper or a metal mesh. The wet-proofing layer may also contain a dispersion of carbon black such as SAB.

The construction of the standard ELAT grew out of many refinements, geared to producing a general-purpose gas diffusion electrode that would work under numerous electrolytic conditions. Lindstrom et al. (U.S. Pat. No. 4,248,682) and the previously cited U.S. Pat. No. 4,293,396 document the progress of the ELAT development. The final structure of the ELAT electrode is determined by the underlying support web, the quantity and kind of carbon black coated onto the web, and the quantity of binder (often Teflon) mixed with the carbon black.

Typically, a final layer of liquid Nafion or ionomer is applied to the face or front of the GDE diffuser to aid in making contact to the electrode (MEA). Such solutions are readily available and come as a 5–10% wt ionomer with an equivalent weight of 1100 or less. Typical levels of Teflon in the Vulcan mix are 5–80% by weight, more preferably 30–70% by weight. The total weight of solid varies by electrode type, but ranges from 0.5 to 25 $mg/cm^2$. The weight of solids is determined by the number of coats applied to the web, and obviously, the weight delivered per pass by the coating device. While any number of the conducting carbon blacks can be employed, for example Shawinigan Acetylene Black, Vulcan XC-72, Black Pearls 2000, or Ketjen Black, in general, the carbon black selected for wet-proofing is hydrophobic while the carbon black selected as the catalyst or electrode layer is more hydrophilic. The Nafion ionomer coated on the face can vary from 0.1 to 2 $mg/cm^2$ is preferred. FIG. 1 is a schematic to delineate these various layers that comprise the structure of the ELAT gas diffusion electrode.

We have changed the structure of the ELAT to accomodate the different reactant and product transport and electronic contact requirements of MEAs. FIG. 1 also shows a comparison of the standard ELAT structure to two embodiments of a new gas diffuser structure. In comparing diffuser type "A" of FIG. 1 to the standard ELAT, one notes both a reduction in the number of coated layers, which translates to less total deposited solids, and with coating layers being placed on only one side of the carbon cloth web. The uncoated side of the web is now oriented toward the gas feedstream while the coated layers are placed against the electrode i.e, the face of the membrane electrode assembly). As will be shown in the Examples, these reduced layers and single-sided coatings allow for a reduced number of fabrication steps, and a thinner, more open structure amendable to high gas flux rates.

For diffuser type "A", there are still two or more types of carbon black employed in the architecture of the structure. These are selected so as to create a gradient of hydrophobicity throughout the structure, as well as to provide a layer than can be more easily wetted at the catalyst interface. However, there are applications where a single kind of carbon black is appropriate, and diffuser type "B" in FIG. 1 illustrates this alternative structure. For diffuser type "B", one or more coats of carbon black and binder are applied on one side of the web. This diffuser would be oriented as type "A", that is, the uncoated side is towards the feedgas plenum while the coated side is against the electrode face of the MEA. Diffuser type "B" is easier to fabricate, and is the least expensive to manufacture.

While much focus has been made on the structure and performance of gas diffusion electrodes, little contribution has been made in the nature and effect of carbon black preparation methods for gas diffusion electrodes. While the sonic horn is frequently cited, we show here surprising enhancements in diffuser and gas diffusion electrode performance through other dispersion methods. For example, one preferred method introduces a pressurized flowing stream of solvent and carbon black in a "Y" shaped chamber that divides the flow into two streams, which are recombined downstream using another "Y". The effect of splitting and recombining the stream introduces high shear and pressure differences on the solvent and carbon black, and effectively wets out the particles in a uniform and consistent manner. A commercial device is available through such companies as Microfluidics (Newton, Mass.). Other methodologies use rotor/stator methodology whereby one set of blades is fixed while the other set is spun at high rates around the fixed set. Such action creates high shear on the sample. Rotor/stator operation are often performed in batch mode. Another device is a mill where a spinning barrel with plates performs the function of delivering shear energy to the solution. Kady Company (Scarborough, Me.) provides a range of these machines. These and similar devices are called "homogenizers" and perform the vital function of dispersing solids into solvent in a uniform and consistent manner. The following Example section describes such a preparation and reports results for diffusers and gas diffusion electrodes unanticipated by simple homogenization of the carbon black solution.

While the placement and number of carbon black layers can control structure, and the method used to disperse the carbon black also determines performance, the technique employed to coat a web with mix determines the final structure as well. The previously cited ELAT patents describe a successful coating on the carbon cloth web results from physically penetrating into the woven structure to encase the fiber bundles with mix. Thus, the coating methodology most appropriate for this function is slot-die, knife-over-blade, or spraying followed by a knife operation. Slot-die coating is the preferred method as the slot acts as a control mechanism that meters out a fixed amount of mix. The weight of solids placed on the web is determined by the line speed, pump rate through the slot die, and mix composition (% solids). Furthermore, since the slot-die acts through creating a constant mass of mix between the slot-die head and the moving web, this coating action serves to both give some penetration into the cloth and compensate for surface roughness inherent in the cloth.

While slot-die has been used to coat various solid and porous substrates, using the slot-die to create gas diffusion electrodes and diffusers is a novel application. Typical widths of a slot-die range from 5–250 mm, but larger dies can be constructed. The gap of the slot die can be controlled via shims, but a typical range is between 4 and 100 mils, and more preferably 15–30 mils. Both the coating of the mix and the size of the drying sections of the coating machine determine the line speed, as the freshly coated web is next run into a heated chamber. Typical line speeds range from 0.1 to 5 m/min. Multiple coats can be applied by a series of slot-die stations, or re-running a freshly-coated web through the machine. Other attachments to a manufacturing line would include a continuous sintering oven and a slitting machine to cut the final product into the desired dimensions.

For mixes consisting of carbon black or catalyzed carbon black and Teflon, a Gravure style coating method can be employed as well. Gravure coating employs a spinning rod that is dipped in mix at the lower half and then contacted with the moving web at the other upper segment. Typically the gravure-coating head spins in a direction opposite the direction of the moving web, allowing some penetration of the mix into the web. The quantity of the mix applied to the web per pass is controlled by the mix rheology, line speed, gravure rotation speed and gravure imprint pattern, and the area of the web contacting the head. Gravure coating works best with low viscosity mixes.

The selection of a coating method as slot-die, gravure, knife-over-plate, or spraying is dependent on the fluid dynamics of the mix, mix stability during the coating process, and the electrode and/or diffuser structure desired on the web. One is not limited to one coating method. Typically, more than one coating station can be applied to the moving web to build up a multi-layer structure if so desired, whereupon the selection of coating station is dependent on the requirements of the mix.

In some cases, the composition of the dispersed carbon black mix is modified by adding additives such as iso-propyl alcohol (from 0.1 to 100%, more commonly between 5 to 30%, and preferably 25%), Fluorinert FC 75 or similar, Neoflon Ad-2CR, polyvinyl alcohol, polyox, or similar stabilizers.

In some operations it is preferable to avoid iso-propyl alcohol, for example due to the constraints and costs of handling organic vapors, and a water-based mix is employed. For this type of mix, one of more of the following stabilizers and thickeners could be employed: Fluorinert FC 75 or similar; Neoflon Ad-2CR; polyvinyl alcohol, ethylene glycol, polyethylene glycol alkyl ether; Polyox®; Triton® X100; Tween®; Joncryl 61J, Rhoplex AC-61, Acrysol GS (acrylic polymer solutions); and naphthalene formaldehyde condensate sulfonates.

The electrocatalyst may be any of those conventionally used such as platinum or a rhodium—rhodium oxide catalyst described in U.S. patent application Ser. No. 013,080 filed Jul. 26, 1998. The specific coating method and stabilizer is dependent on the structure of diffuser desired.

In the following examples, there are described several preferred embodiments to illustrate the invention. However, it should be understood that the invention is not intended to be limited to the specific embodiments.

EXAMPLE 1

A standard ELAT is constructed for comparison with diffuser or gas diffusion electrode structures of type "A" of "B". A web consisting of carbon cloth with a warp-to-fill ratio of unity, with approximately 25 to 50 yarns per inch, and a carbon content of 97–99% was selected from an available thickness of 5–50 mils, preferably around 10 mils. An appropriate weight of SAB or Vulcan XC-72 was dispersed with an ultrasonic horn. A solution of fluorinated hydrocarbon, otherwise called Teflon, was added to the mix to form a 50% wt (solids) component. To the web, a first mixture of dispersed SAB was coated onto each side, until coverage of approximately 3.5–7 mg/cm$^2$ was obtained. This layer was considered the wet-proofing layer. The electrode was air dried at room temperature in between each coat. To this dried assembly, a second but similar mix of dispersed platinum catalyst on Vulcan XC-72 Teflon was coated on one side. Between one and eight coats were provided to achieve the desired metal loading, typically 0.2 to 52 mg catalyst/"cm$^2$". After the final application, the coated fabric heated to 340° C. for about 20 minutes. As described, this would be a gas diffusion electrode. To make a diffuser, similar steps are performed except uncatalyzed Vulcan XC 72 is employed.

EXAMPLE 2

To construct a gas diffusion electrode or diffuser of type "A" structure of the invention, an identical procedure as outlined for Example 1 was followed, except the SAB/Teflon wetproofing layer was applied to one side of the web at approximately half the total carbon black loading, i.e. 1.5–3 mg/cm$^2$. The catalyst coat and final treatment followed that as detailed above. To make a diffuser, similar steps were performed except uncatalyzed Vulcan XC 72 with a loading range of 0.5–1.5 mg/cm$^2$ carbon black was employed.

EXAMPLE 3

To construct a gas diffusion electrode or diffuser or type "B" structure of the invention, an identical procedure as outlined for Example 2 was followed. However, only the SAB/Teflon wetproofing layer or platinum catalyzed Vulcan XC-72 was applied to one side of the web at at total loading of approximately 0.5–5 mg/cm$^2$. Similar drying and heating steps as Example 1 followed. A diffuser was constructed in an identical manner except either SAB or Vulcan XC-72 without catalyst was employed.

EXAMPLE 4

A type "B" gas diffusion electrode similar to that of Example 3 was constructed through an automated coater. For this example, a knife-over-plate coater was used and the coater employed a 255 mm perpendicular stainless steel blade with a 45° C. beveled edge. The blade was positioned over the cloth with a fixed gap of approximately 10 mils. The line speed was 2 meters/min., and mix, prepared as in Example 3, was fed at continuous rate to a reservoir in front of the blade. Samples thus prepared were subjected to the same heating and drying steps of Example 1.

EXAMPLE 5

Homogenized mixes of carbon black were created through the use of Microfluidic's microfluidizer. A suspension of water and appropriate weights of either SAB or Vulcan XC-72 was fed to the machine, which was pneumatically operated. A single chamber configuration was employed using the 100 micron chamber, although other chamber sizes could be used as well. After a single pass through the homogenizer, Teflon was added to the mix in the same proportion as established in Example 1. The mix was filtered, and coated onto a carbon web as detailed in Example 1 or Example 2.

EXAMPLE 6

To prepare a diffuser similar to Type "A" with the slot die coating methodology, a mix similar to that described in EXAMPLE 5 is prepared, except prior to filtering a finite amount of Triton X100 is added to the carbon black solutions to make up approximately 1% weight Triton X to weight of carbon black. A typical range for this additive is 0–5% based on weight of carbon black. Furthermore, some dissolved Polyox is added to the solution in the amount of 10% weight based on carbon black. The typical range for this additive is 0–20% based on the weight of carbon black. Excess solution is removed.

A mix of Shawinigan Acetylene Black (SAB) or Vulcan XC-72 as prepared above is placed in a pressurized vessel that is connected to the slot die. A pressure of 10–15 psi is applied to the vessel to deliver mix to the slot-die head at an appropriate rate. The 250 mm long slot die is oriented to ride on the carbon cloth web, a gap of 18 mils is set for the slot die. For both the SAB and Vulcan mixes, the web passes the coating head at 2 m/min. Multiple coats of SAB and Vulcan are applied to the web until an appropriate weight of carbon is distributed. The coated cloth is dried prior to each additional coat. The final assembly is sintered at 340° C. for 20 minutes prior to testing.

EXAMPLE 7

To prepare a catalyzed gas diffusion electrode similar to Type "A" with the gravure coating methodology, a mix similar to that described in EXAMPLE 5 is prepared, except now less water is removed and a less viscous consistency is attained. Also, the Vulcan XC-72 is catalyzed with a 30% wt of platinum. A carbon cloth web is rolled past a 12.7 mm diameter, 250 mm long gravure head that is rotating at 100 rpm. This gravure head has a 5.3 cell/cm$^2$ pattern across the surface to aid in pick-up and distribution of the mix. The web is first coated with SAB at the rate of 2 m/min. Several coats are applied with air drying in-between coats. Next several layers of 30% Pt on Vulcan XC-72 are applied at 1 m/min, with drying in-between coats. The final assembly is sintered at 340° C. for 20 minutes prior to testing.

EXAMPLE 8

In order to illustrate various aspects of these new electrode/diffuser structures, a series of diffusers is prepared and compared to the commercially available ELAT™ diffuser. Several Type "A" diffusers of varying thicknesses are prepared according to the methods described in EXAMPLE 2 except the total weight of solids is increased or decreased to adjust the final assembly's thickness. A type "B" diffuser of SAB was prepared according to the methods described in EXAMPLE 3. For both these Type "A" and "B" diffusers, the methodology of dispersion of EXAMPLE 5 is employed. Table 1 summarizes the key differences among the backings. The thickness of each diffuser is taken with nine measurements across the entire (100 cm$^2$) sample. A representative thickness of each type of diffuser is the total average of these nine measurements and number of backing samples.

TABLE 1

Diffusers

| Diffuser Type | Description | Thickness +/− mils | No. Samples |
|---|---|---|---|
| B | Uniform thin hydrophobic microporous layer | 17.0 +/− 0.6 | 4 |
| A | Composite of very thin hydrophobic and hydrophilic microporous layers | 15.6 +/− .2 | 4 |
| A | Standard composite of thin hydrophobic and hydrophilic microporous layers | 16.2 +/− 0.7 | 5 |
| A | Thick composite of hydrophobic and hydrophilic microporous layers | 18.8 +/− 1.0 | 4 |
| Standard ELAT | Coatings on both sides of web | 19.4 +/− 0.6 | 6 |

For porous and/or fibrous gas filtration media, resistance to flow is often used as a characteristic measure for quality control and performance. This measurement is standardized and so widely performed that a commercially produced instrument is employed, called a "Gurley" device. The Gurley number is the time it takes to move a fixed pressure through a fixed area of sample, and thus the Gurley number indicates the resistance to gas flow. As the diffuser permeability is an important parameter for optimized fuel cell operation, the Gurley number is a good method to quantitatively characterize diffusers.

To determine the 'Gurley' number of the various diffusers, an apparatus for measuring resistance to flow was constructed employing two water-filled "U" tubes, one 80 and the other 40 cm long, a nitrogen flow meter (0–20 LPM), and a back-pressure valve. Samples of electrode backing (10×10 cm.) are cut and fitted into a manifold with gaskets (5×5 cm. exposed area), such that the uncoated side of the backing is oriented towards the nitrogen inlet. Prior to evaluation of a backing sample, the system's inherent resistance to gas flow is evaluated by measuring back-pressure in the U-tubes over a range of flow rates. This system "resistance" is used as a correction in subsequent diffuser measurements.

In order to first establish an appropriate evaluation range, five samples of standard Type "A" diffusers were subjected to a series of output flow rates. These output rates are fixed by progressively increasing the input flow through the output back-pressure valve and/or input flow rate, and noting the output flow and input and output U-tube pressure. The output flow was varied from 1 to 7 LPM. Pressure differentials, corrected for the system resistance, are calculated, and the output flow rate in LPM is divided by the differential pressure in units of cm. of H$_2$O, which is then normalized to the exposed backing area or 25 cm$^2$. The resulting value is the characteristic constant for resistance to flow and is similar to the Gurley number. A plot of output flow versus the calculated resistance to flow shows that non-uniform flow is realized at the low and high flow rates, and an output ranges of 2–4 LPM is best for these measurements on diffuser materials. Based on this result, an output flow of 3.0 LPM was selected for subsequent comparative measurements.

An additional effect of the diffusers on PEM Fuel Cell performance is related to its role in helping to maintain water balance within the cell. Water balance in the fuel cell entails a delicate balance of hydrophobic and hydrophilic character within the backing layer. This balance depends critically on operating parameters such as current density of operation (which determines how much water is generated), humidification conditions and the flow rate of gases into the cell. Thus, depending on how the fuel cell is run with regards to current density, hydration, type of ion exchange membrane, and flow characteristics to the diffuser the hydrophilicity of the backing is also crucial as well as the structure of the diffuser. Thus, to illustrate how different diffuser structures effect transport under a constant set of operating conditions, these same samples were evaluated in a single cell of a PEM Fuel Cell testing apparatus.

RESULTS

Samples of ELAT or type "A" gas diffusion electrode were subjected to small scale tests in an apparatus designed to remove system influences from the experiment. That is, typical operation of a fuel cell or electrochemical process may be dependent on cell design, assembly, and system control parameters. This test used an electrolyte solution and catalyzed electrode to eliminate contact variance between the typical diffuser and MEA. Thus, the catalyst in this system was "wetted" and the results reflect electrode structural differences when the same catalyst and and catalyst loading were employed.

A gas diffusion electrode holder (1 cm dia.) was constructed whereby the catalyzed face was positioned in a solution containing $0.5\underline{M}H_2SO_4$ while the backside was subjected to an open gas plenum of approximtely 20 cc. A potentiostat and three electrode set-up were employed to precisely control the applied potential to the test sample. A sheet (2.5×2.5 cm) of platinum served as the counter electrode. Standard ELAT samples containing 30% Pt/C, 1 mg/cm$^2$ were prepared using the method of Example 1. Type "A" electrodes were fabricated according to the steps of Example 2, whereupon the catalyst and loading was the same as the ELAT. Each electrode was sprayed with Nafion resulting in a coverage of 0.5 mg/cm$^2$. After mounting in the holder, samples were immersed in the acid solution, which had been heated to approximately 55° C. The electrodes were first fed oxygen at a stoichiometric excess (greater than 10 fold) under a very slight pressure -2 mm H$_2$O) for conditioning as negatives potentials were applied vs. saturated calomel electrode (SCE) to reduce oxygen. After the exposure to oxygen, the cell was disconnected, flushed with nitrogen, and hydrogen was fed to the electrode under the same slight pressure and stoichiometric excess. Positive potentials were applied and the current was recorded. No accomodation for IR was made in the measurements, although 0.5 -1ohm had been measured through the electrode holder. Multiple samples from each ELAT or type "A" gas diffusion electrode were tested and averaged and the reported error bars were one standard deviation.

FIG. 2 is a plot of these tests. The applied potential is listed on the abscissa, while the resulting current due to hydrogen oxidation is displayed on the ordinate axis. Since the catalyst and wetting characteristics were identical for these structures, one concludes that the increase in current for type "A" over the ELAT gas diffusion electrode was due to the improved structure of the type "A" electrode.

The surprising effect of homogenized carbon is shown in FIGS. 3 and 4. In this test, standard ELATs were prepared as outlined in Example 1 but now used homogenized SAB and Vulcan XC 72 as described in Example 5. The three different gas diffusion electrodes (standard ELAT, ELAT with homogenized wet proofing layer, and ELAT with both SAB and Vulcan layers homogenized) were tested using the same testing procedure as detailed above, except both the oxygen and hydrogen curves were recorded. FIG. 3 is the oxygen reduction curve. Although there was some scatter in the data, attributed to uncompensated IR, it can be seen that as the layers were progressively homogenized, greater reductive (or negative) currents were generated for a fixed potential. A significant and unexpected improvement in ELAT performance was realized through homogenization of the carbon blacks. FIG. 4 is a similar plot except the electrode was used as an anode in ambient hydrogen and a significant and unexpected improvement was shown.

The same electrodes were next assembled in a fuel system to confirm the improvement. For this test, a standard fuel cell test station (Fuel cell Technologies, Inc. NM) was used to control and humidify feed gasses, provide an electronic load, and record data from a cell 16 cm$^2$. For these tests, electrodes were mechanically compressed against Nafion 115 to form the MEA. An ELAT with homogenized SAB and Vulcan XC 72 layers was used as a cathode, and the test was performed in air and oxygen. FIG. 5 shows the average results of five replicate standard ELATs compared to a typical homogenized carbon black ELAT when using air as the oxidant. For these plots, the fixed cell voltage is listed on the ordinate, while the recorded current is on the abscissa. FIG. 6 is similar to FIG. 5 except pure oxygen was the oxidant. In both FIG. 5 and FIG. 6, an improvement was seen for these electrodes in an actual system. It is surprising that a simple processing step, i.e. homogenization, produces such an increase in current for a fixed voltage (greater power).

The next example combined the improvements of carbon black homogenization with the new structures. A type "A" diffuser was constructed according to the homogenization procedure of Example 5. Since this was a diffuser, it was assembled as part of a MEA whereby the catalyst layer has been deposited directly on the ion conducting membrane. In this test, comparison was made with a standard ELAT diffuser and the type "A" structure in a fuel cell set up incorporating a cell 50 cm$^2$. The cell was operated with hydrogen and air, and the load was systematically varied. FIG. 7 shows data that revealed an improvement unanticipated by either structural or homogenization changes alone. The trace labeled "old" is the standard ELAT diffuser and the trace labeled "new" is the new diffuser structure with homogenized carbons. At the extreme loads, there was a test of a diffuser's ability to transport oxygen and water vapor, and it shows a remarkable 1oo% improvement in current density for a cell voltage of around 0.4 volts. This example clearly shows a remarkable synergistic effect between the carbon dispersion and new diffuser structures.

Although the above examples have used fuel cell tests, diffusers and MEAs can be used in industrial electrochemical processes as well. A type "B" gas diffusion electrode composed of platinum catalyzed Vulcan XC-72 pressed against Nafion 430 was constructed and this same style of electrode was then manufactured through the knife-on-plate method described in Example 4. The performances of these cathodes operating as oxygen consuming electrodes in a concentrated HCl solution were compared. FIG. 8 summarizes the current potential curves derived from 6.25 cm$^2$ samples of the type "B" assemblies. As shown here, the automated coating process did not introduce any significant changes in the structure of the electrode, and no difference in current was obtained.

A type "B" gas diffusion electrode composed by hand as illustrated in EXAMPLE 2 and then compared to a gravure method machine-coated Type "B" gas diffusion electrode as illustrated in EXAMPLE 7, whereby the platinum content is within 10% of each other. The two electrodes are tested whereby 16 cm$^2$ samples of each are used as anodes and cathodes and evaluated PEM Fuel Cell elements in a hydrogen air mix at 70° C. FIG. 9 summarizes the current potential curves derived from these samples. As shown here, the automated coating process did not introduce any significant changes in the structure of the electrode, and no difference in current was obtained.

A series of diffusers are constructed to illustrate the range of structures available for gas diffusion electrode or electrode backing applications. The gas permeation rate through the series was compared using the modified Gurley apparatus. A summary of resistance to flow measurements for the three types of electrode backing are shown as a bar chart in FIG. 10. For the Type "A", three different thicknesses of carbon black were tested. One would anticipate that the resistance to flow should increase as the diffuser thickness increases. This trend is followed by the data. The standard double sided ELAT and thick Type "A" diffuser show a greater resistance to flow than the standard Type "A". It is interesting to note that the thin Type "A" diffuser shows the greatest relative standard deviation across the average of measurements, indicating that the microporous coating of carbon black may have random pin-holes and thus show lower resistance to flow than the standard Type "A". These data demonstrate that one can adjust the porosity and tortuosity in the diffuser structure, and that a suitable range of resistance to flow constants is over the range of 0.06 to 0.005 LPM/cm H$_2$O/cm$^2$, and more preferably from 0.05 to 0.008 LPM/cm H$_2$O/cm$^2$.

While porosity and tortuosity (as measured on a macroscopic scale by the Gurley measurements) do contribute to the performance of electrode backings (as we will show here), other factors such as catalyst layer permeability and ionic conductivity, backing hydrophobicity and water transport through the backing may contribute more significantly. We subjected this series to evaluation in a PEM Fuel Cell test apparatus.

A collection of polarization curves obtained for cells with different diffusers operating an oxygen, and 13.5% O$_2$ in N$_2$ are shown in FIG. 11. The results indicate that backings Type "A" thick and the standard ELAT exhibit limiting current behavior at ca. 20% lower current densities than for the other cases. This suggests that the thicker backings, with their lower gas permeation rates, exhibit more sensitivity to the particularly dilute portions of the cathode flow stream.

Although the uniformly hydrophobic backing Type "A" exhibits slightly lower performance relative to the thin and standard Type "B"s at the lower current densities, this diffuser has similar performance at high current density. Thus, there is some merit in creating a diffuser of completely uniform hydrophobicity. These results here indicate that a wide variety of structures are suitable for PEM Fuel Cells, and that the structure of the diffuser (or gas diffusion electrode) has to be matched to the specific operating conditions as well as cell design. All of these structures show an improvement over the standard ELAT design under dilute cathode feeds.

These examples demonstrate that new and unexpected advances in performance are obtained when combining homogenization in the preparation steps with the new gas diffusion electrode structures. These are fabricated into MEAs by either assembling a diffuser with a catalyst-coated membrane, or by incorporating a gas diffusion electrode with the membrane. The step of homogenization can be used to prepare mixes for automated coating, and the new structures are capable of being produced in an automated fashion.

Referring now to the drawings.

Figure 1:
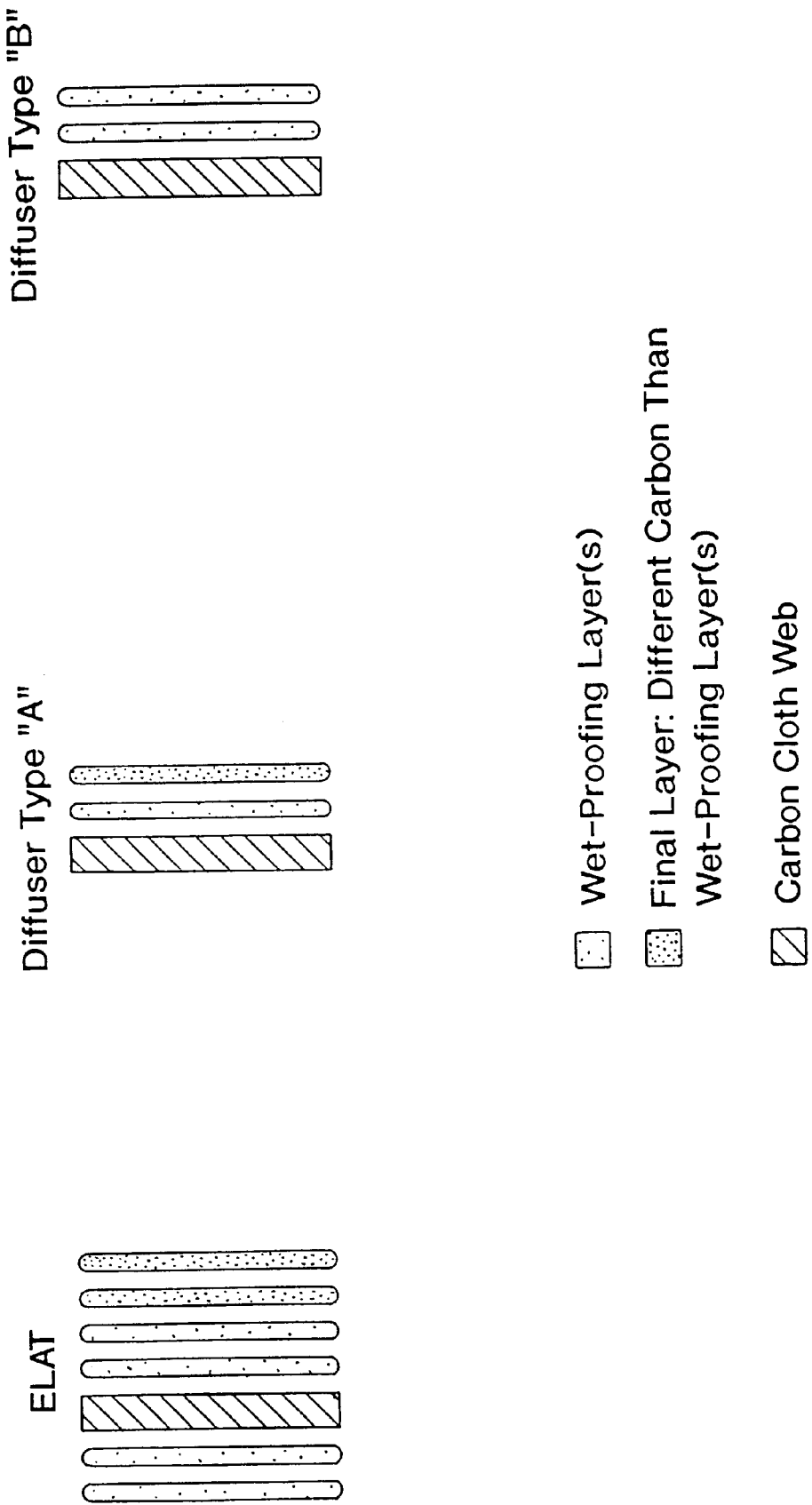
FIG. 1 is a schematic of new diffuser and gas diffusion electrode structures where each layer of carbon black represents a coat, although the depicted number of coats does not limit these embodiments.
Figure 2:
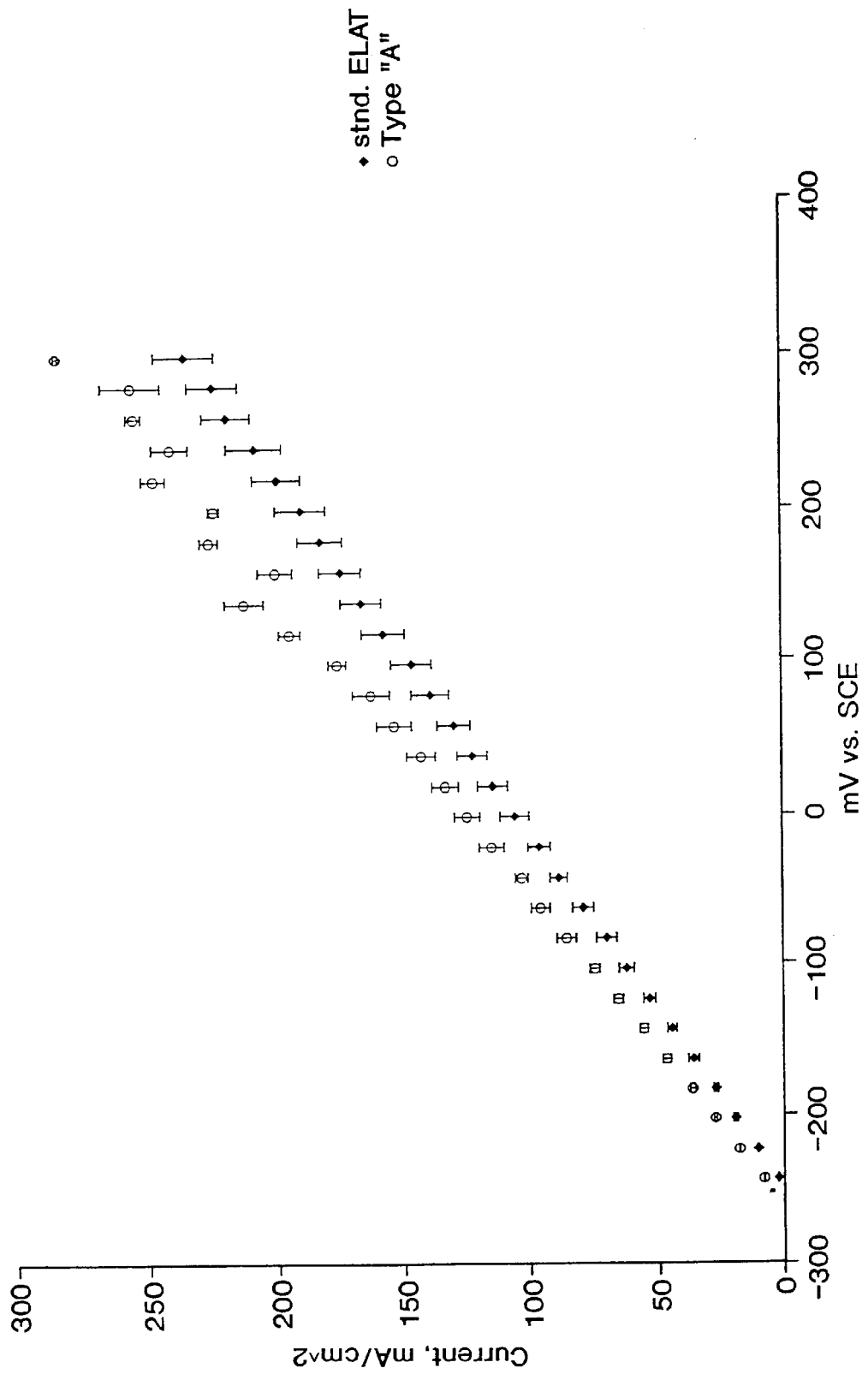
FIG. 2 is a three-electrode testing of standard ELAT gas diffusion electrode versus type "A" electrode and both electrodes were composed of 30% Pt/C, 1 mg/cm$^2$ loading. Electrodes are constructed according to Example 1 and Example 2 specifications and tested in hydrogen at ambient pressure.
Figure 3:
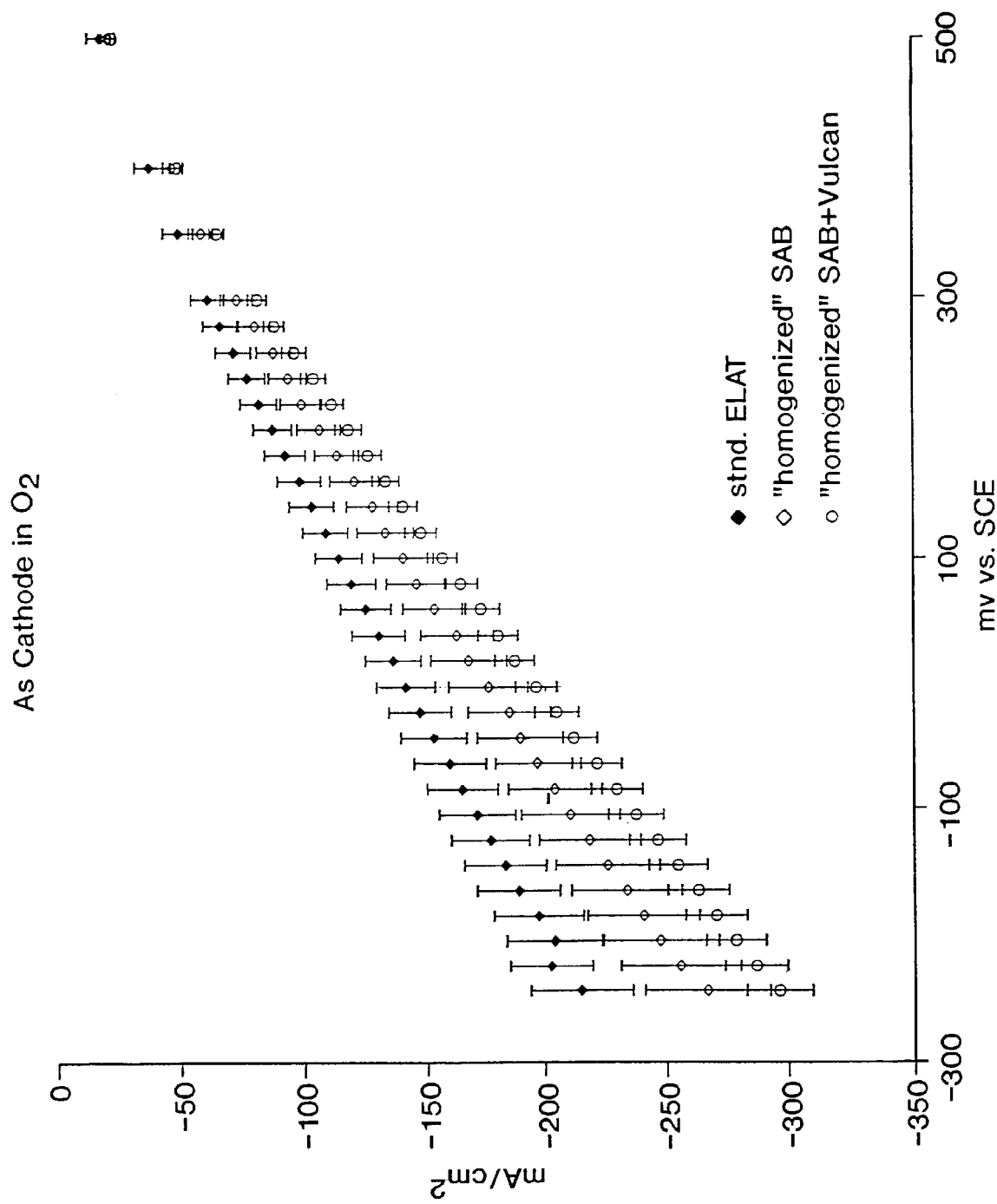

FIG. 3 is a three-electrode testing of homogenized carbon in standard ELAT gas diffusion electrode. All electrodes were composed of 30% Pt/C, 1 mg/cm$^2$ loading. Electrodes were constructed according to Example 5, whereupon either the wet proofing SAB or both the SAB and Vulcan layers were homogenized. Tested in oxygen at ambient pressure.

Figure 4:
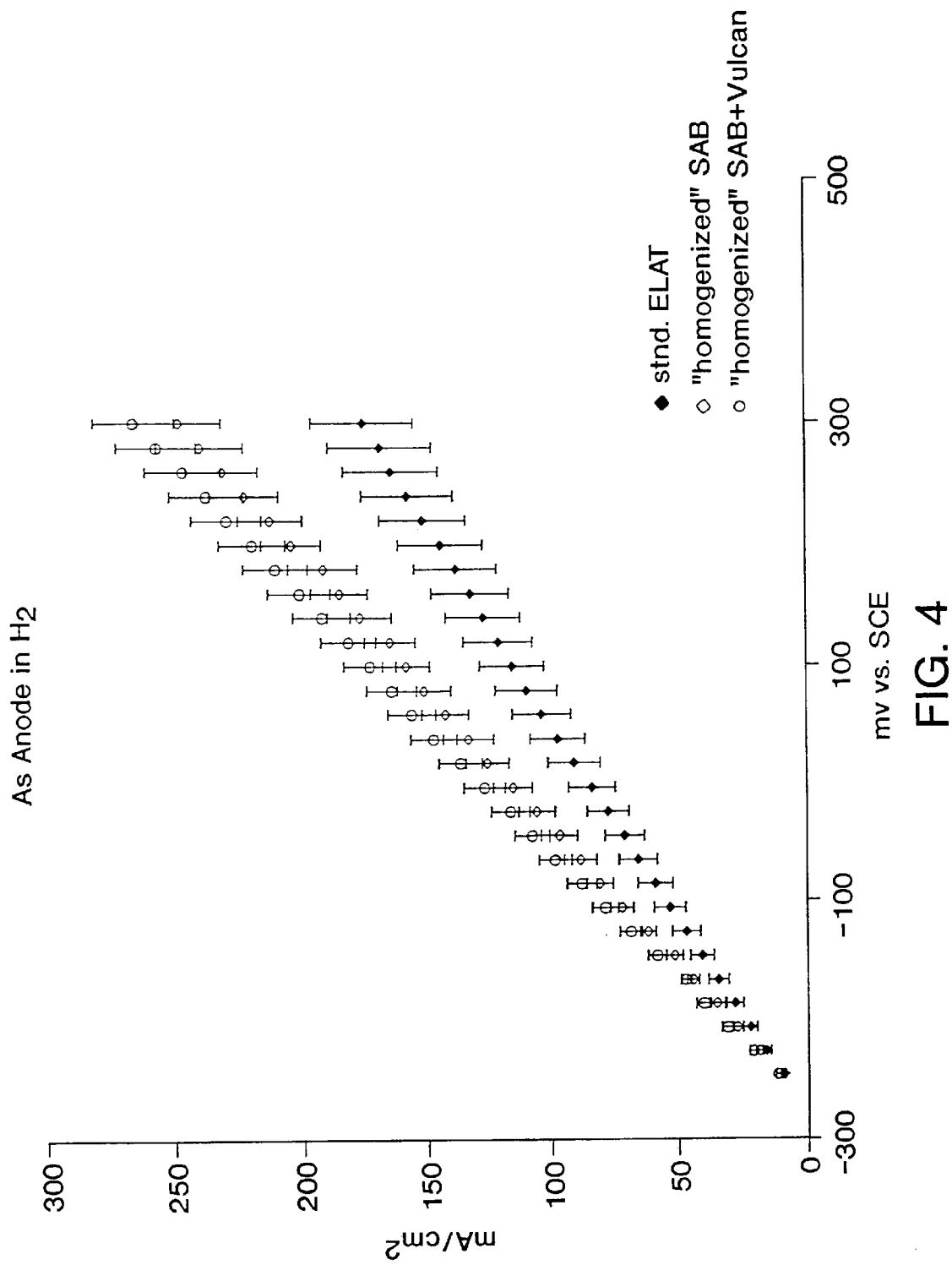

FIG. 4 is a three-electrode testing of homogenized carbon in standard ELAT gas diffusion electrode. All electrodes were composed of 30% Pt/C, 1 mg/cm$^2$ loading and constructed according to Example 5, whereupon either the wet proofing SAB or both the SAB and Vulcan layers were homogenized. Tested in hydrogen at ambient pressure.

Figure 5:
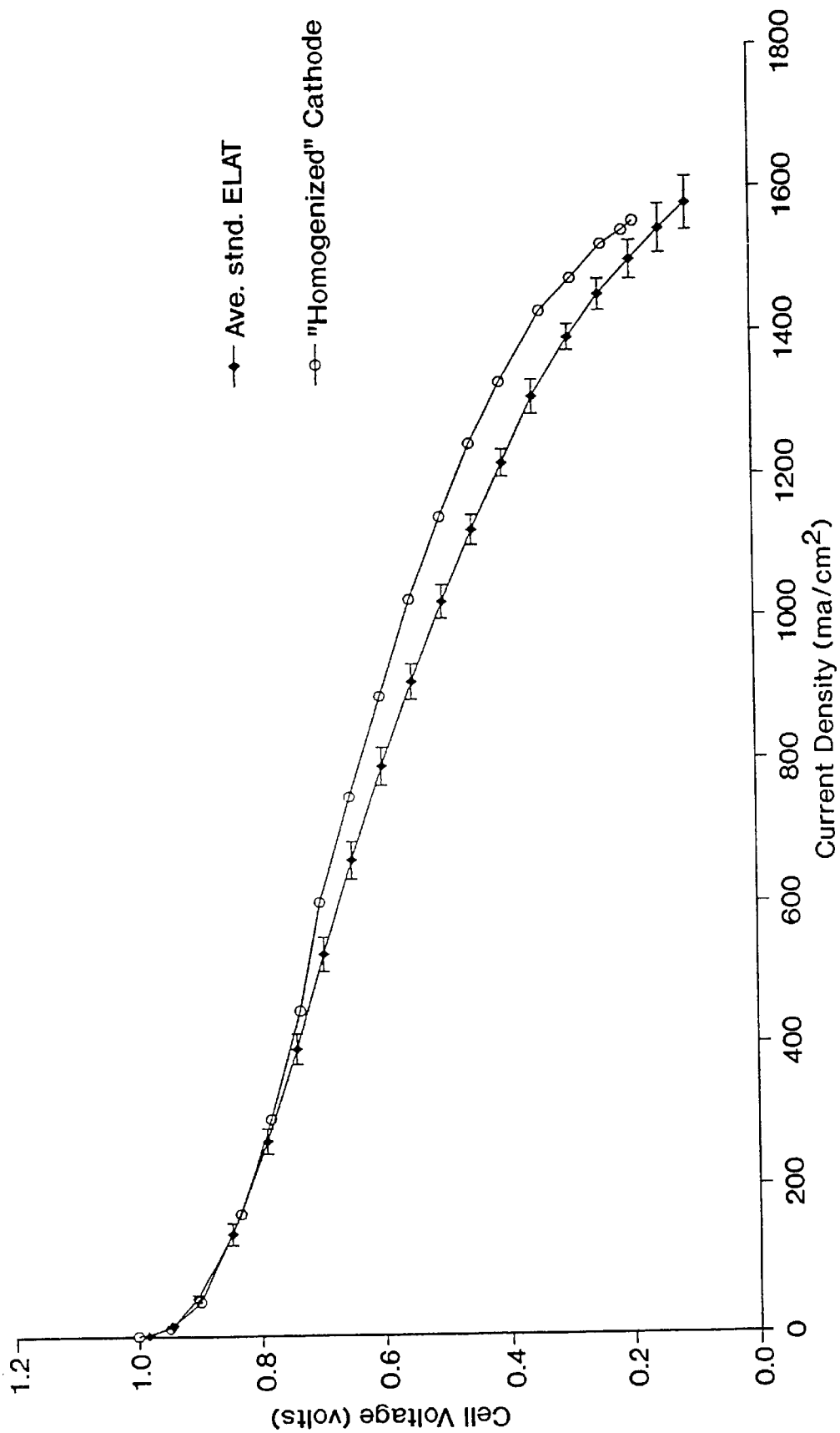

FIG. 5 is a fuel cell testing of standard ELAT gas diffusion electrode compared to standard ELAT constructed according to Example 5, whereupon both the SAB and Vulcan layers were homogenized. All electrodes were composed of 30% Pt/C, 1 mg/cm$^2$ loading and MEA were assembled using Nafion 115. The system was operated with hydrated gasses at 70° C., and hydrogen at 3.5 Bar (absolute) and air at 4.0 Bar (absolute). A two-fold stoichiometric excess of oxidant was fed based on the highest current density.

Figure 6:
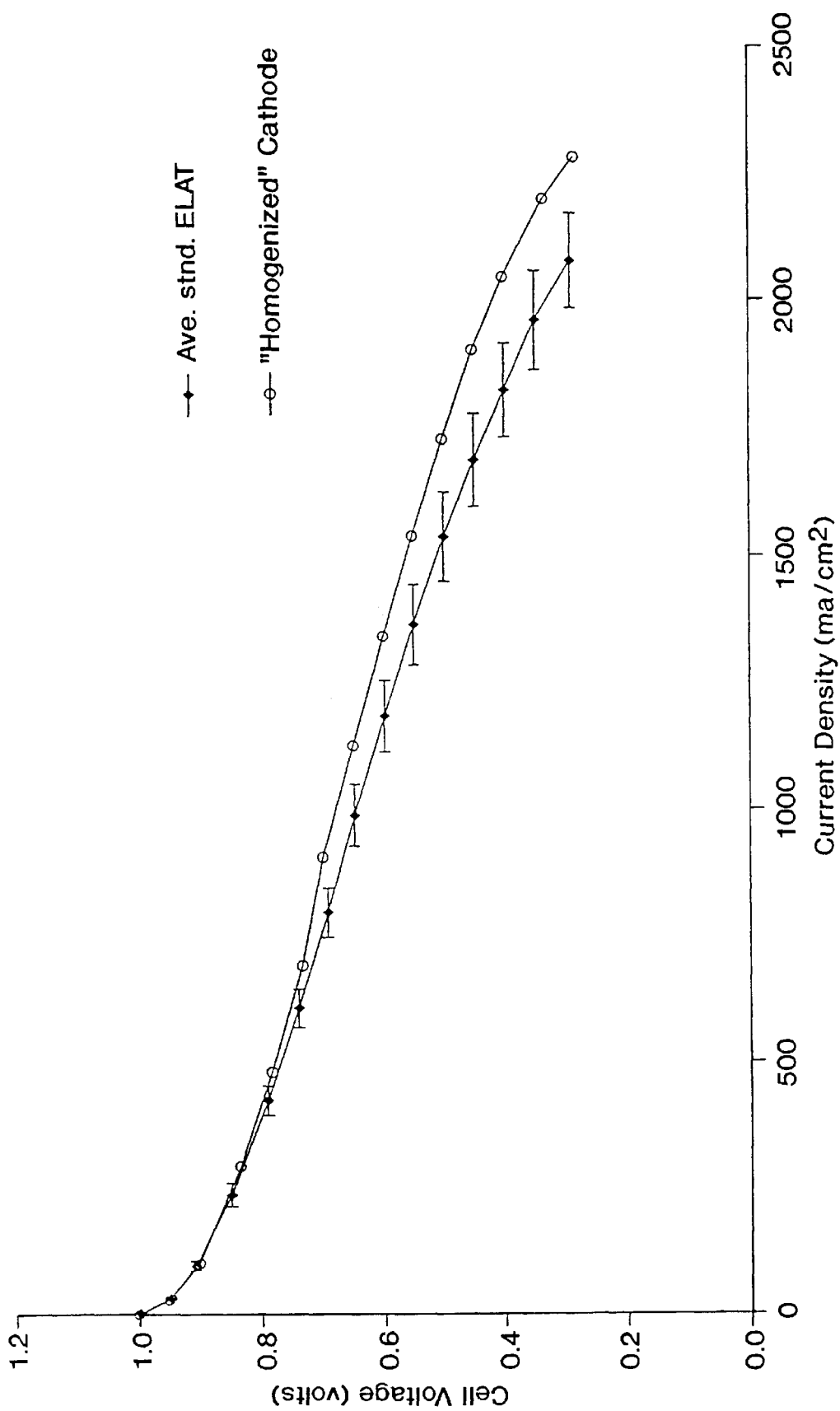

FIG. 6 is a fuel cell testing of standard ELAT gas diffusion electrode compared to standard ELAT constructed according to Example 5, whereupon both the SAB and Vulcan layers were homogenized. All electrodes were composed of 30% Pt/C, 1 mg/cm$^2$ loading and MEA was assembled using Nafion 115. The system was operated with hydrated gasses at 70° C., and hydrogen at 3.5 Bar (absolute) and oxygen at 4.0 Bar (absolute). A two-fold stoichiometric excess of oxidant was fed based on the highest current density.

Figure 7:
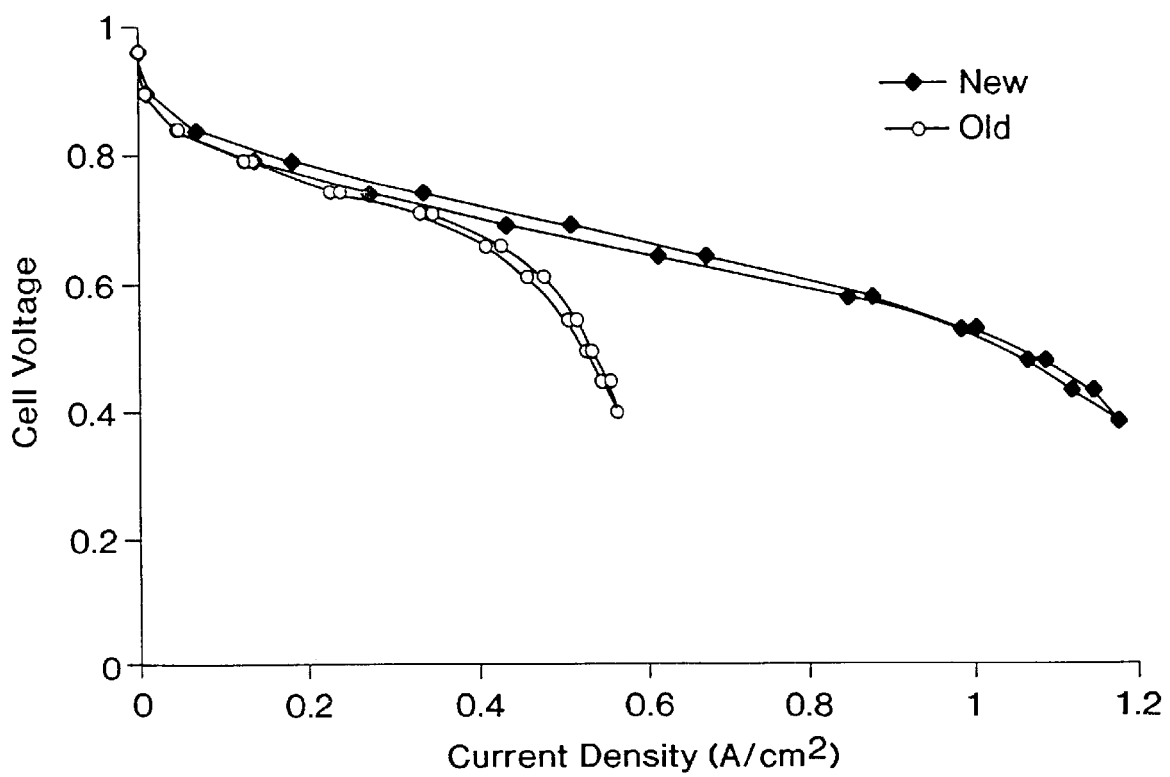

FIG. 7 is a fuel cell testing of standard ELAT diffuser (labeled "Old") compared to type "A" diffuser constructed according to Example 5 (labeled "New"), whereupon both the SAB and Vulcan layers were homogenized. An identical MEA was employed for each test and the system was run at two-fold stoichiometric excess of air based on the 1A/cm$^2$ while the hydrogen was continuously varied at two times stoichiometry based on the load requirements.

Figure 8:
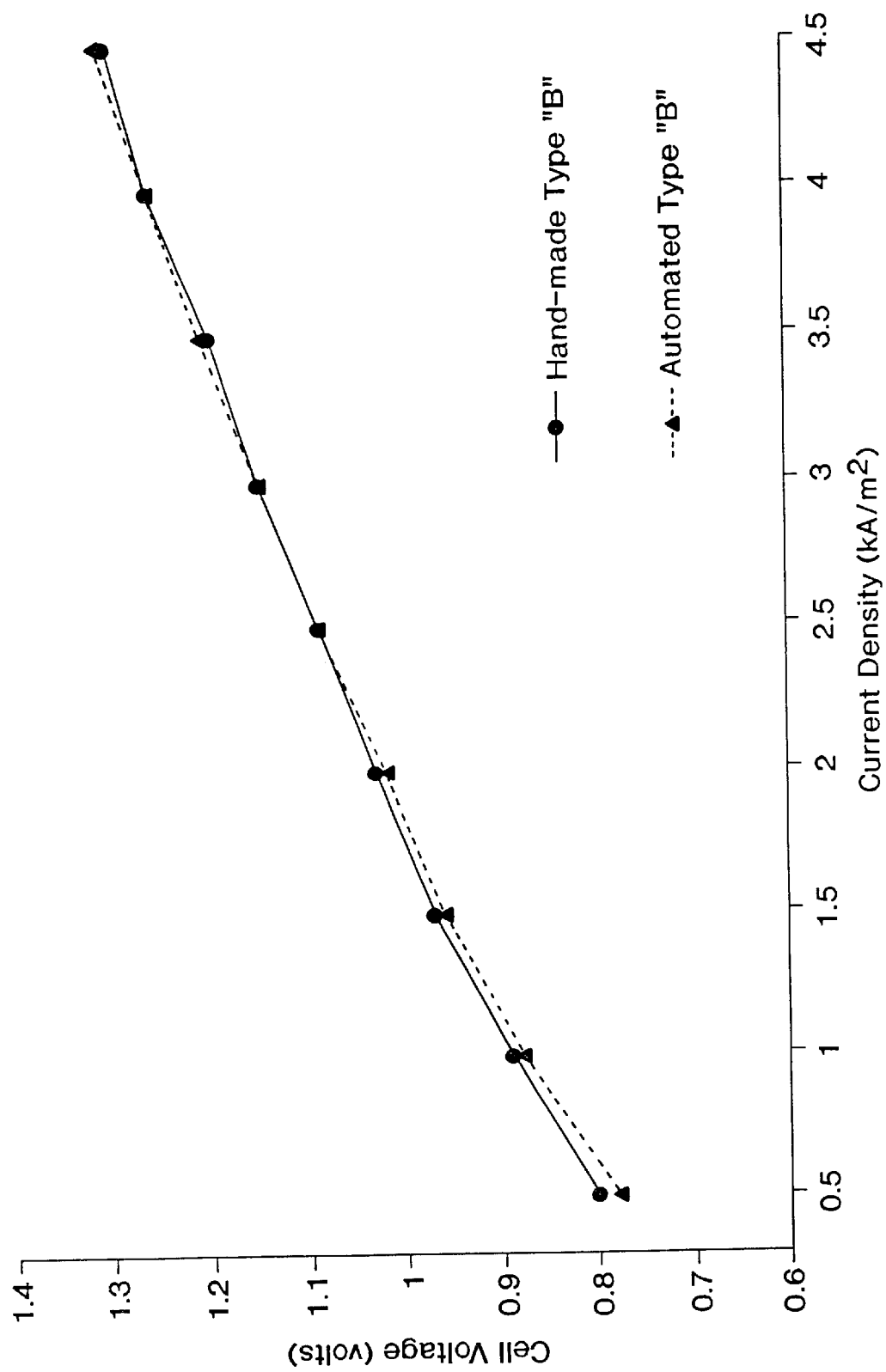

FIG. 8 is a comparison of type "B" electrodes made by hand and by knife-over-blade automated coating. Both electrodes were composed of 30% Pt/C, 1 mg/cm$^2$ and assembled with Nafion 430 to form the MEA. Oxygen was at a five-fold stoichiometric excess with the highest recorded current, and a back pressure of upwards to 50 cm. H$_2$O was employed while a solution of 184 g/l HCl was circulated and kept at 55° C.

Figure 9:
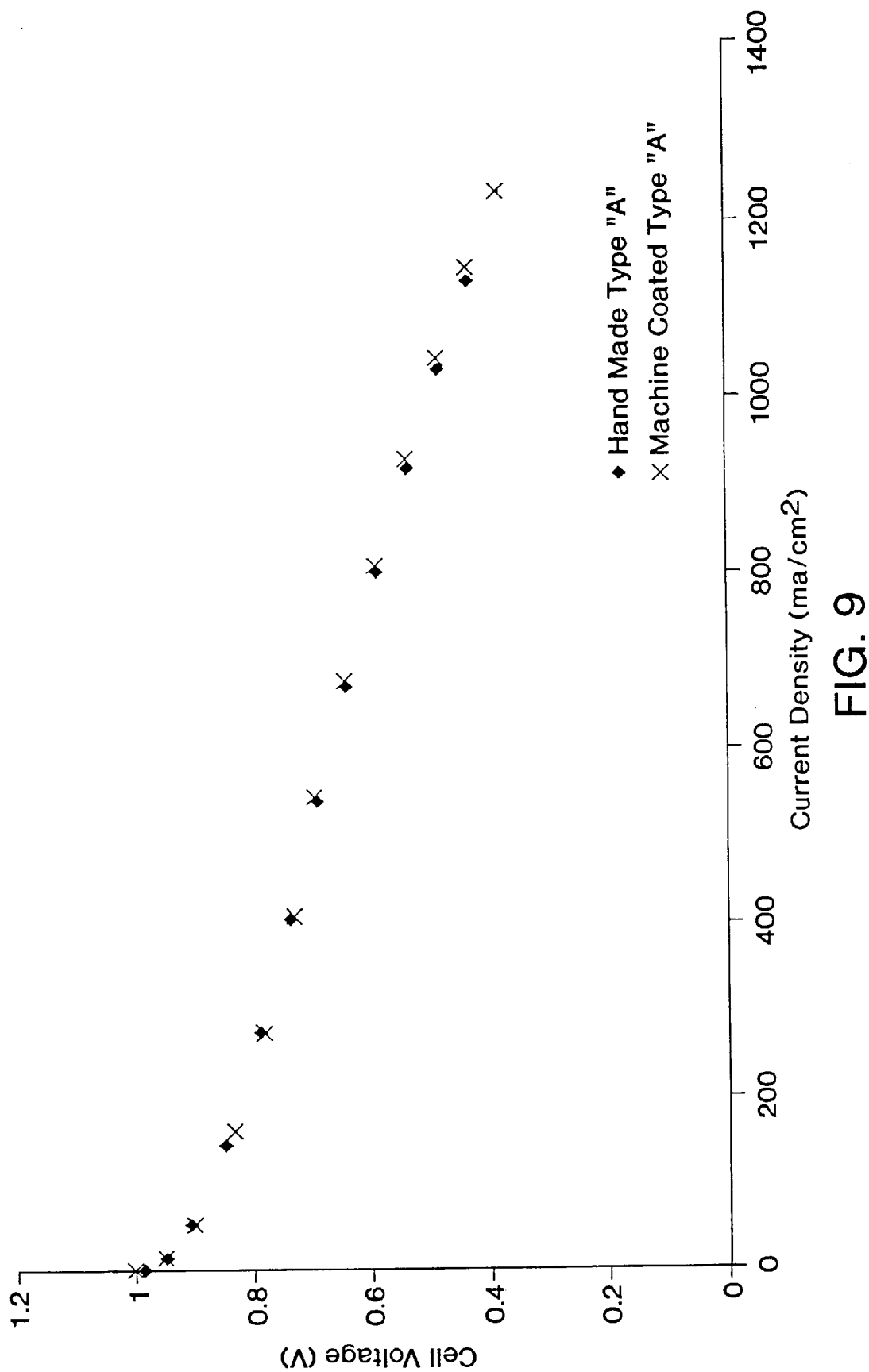

FIG. 9 is a comparison of Type "A" electrodes made by hand and by gravure machine coating. Both electrodes were composed of 30% Pt/C: the hand made electrode at 1 mg/cm$^2$ while the machine electrode at approximately 0.9 mg/cm$^2$, and assembled with Nafion 115 to make a MEA.

The cell was operated at 70° C. with hydrated gasses, and hydrogen at 3.5 Bar (Absolute) and air at 4.0 Bar (Absolute). A two-fold stoichiometric excess of air based on the highest current density was employed.

Figure 10:
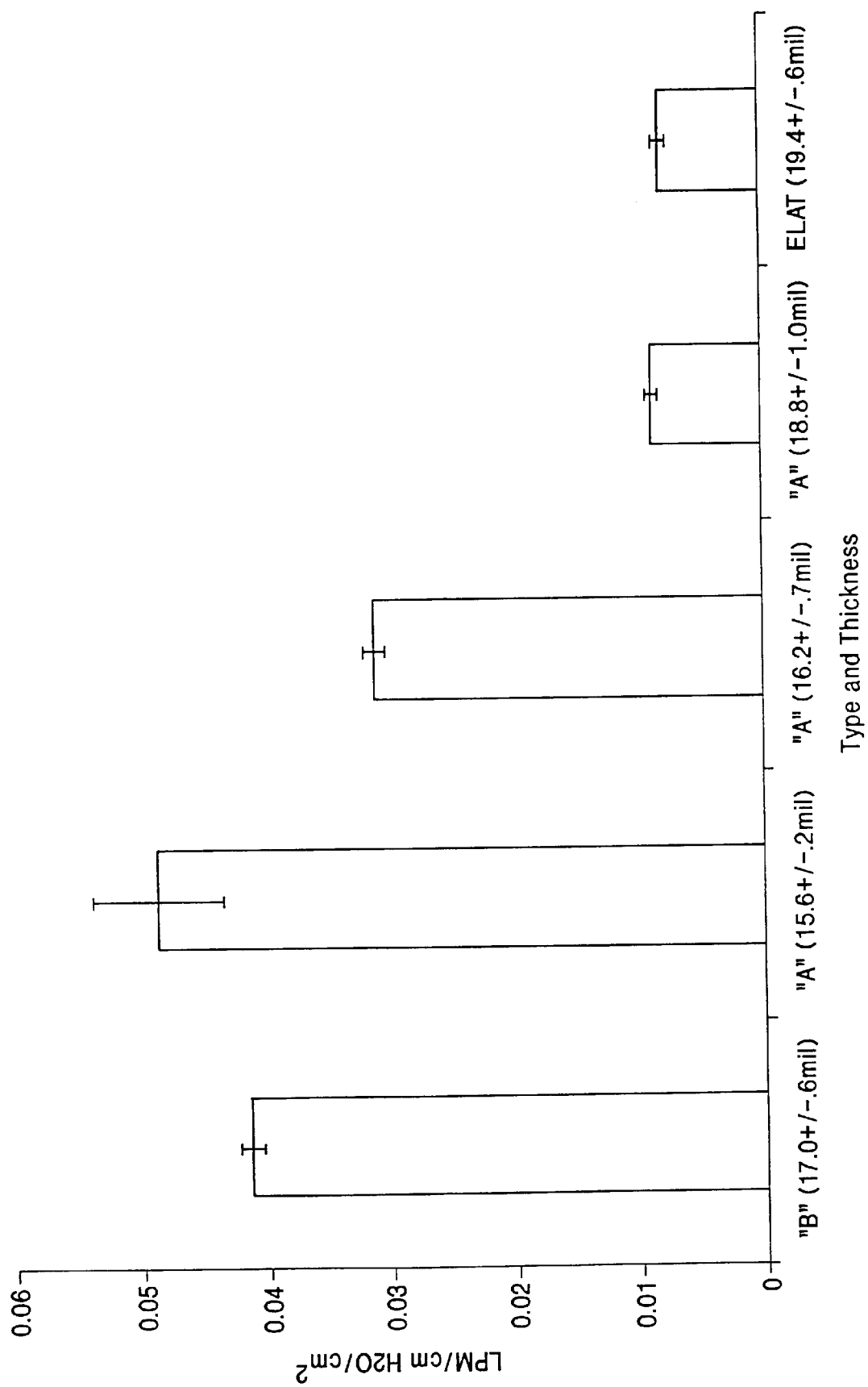

FIG. 10 is a bar chart comparing the resistance to flow for a series of Type "A", a type "B", and a standard E-TEK ELAT described in Table 1. The average thickness for the group of samples is listed as well as one standard deviation of error in the bar graph.

Figure 11:
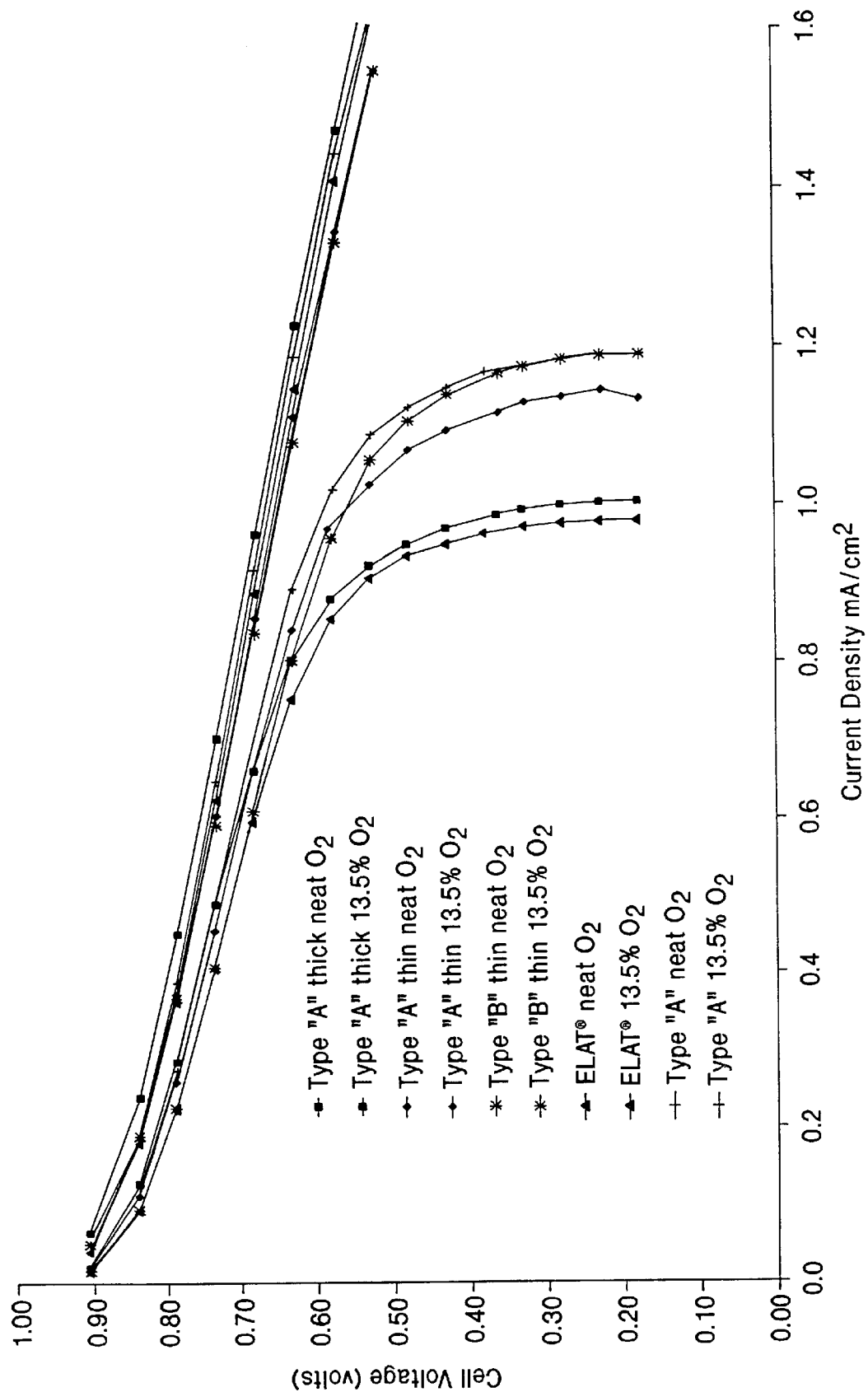

FIG. 11 is a comparison of current vs. potential for MEAs employing the various diffuser structures cited in FIG. 10. Test conditions: 50 cm$^2$ cell, Pt loading 0.15–0.2 mg/cm$^2$ for anode and cathode whereby metal is deposited directly on Nafion membrane.

The cell was operated at 80° C. while the anode and cathode back pressure=30 psig; 1.5 stoichiometric anode and cathode flow rate. Neat oxygen and 13.5% oxygen are employed as the oxidants. Hydrogen is the reductant.

What we claim is:

1. A method of producing a gas diffusion electrode comprised of an electrically conductive web provided on at least one side with a layer of a homogenous dispersion of carbon black, comprising
    a) preparing a water-based, organic-free dispersion mixture of a carbon black with a homogenizer,
    b) adding a binder to the resulting mixture,
    c) adding at least one dispersion-stabilizing substance to the mixture.
    d) applying at least one coat of said water-based, organic-free dispersion mixture to an electrically conductive web by using at least one coating head,
    e) drying said dispersion mixture on the web, and
    f) sintering the resulting electrode at 300–400° C.

2. The method of claim 1 wherein said at least one coating head is selected from the group consisting of gravure and slot-die coating heads.

3. The method of claim 2 wherein said first carbon black in said first dispersion mixture is hydrophobic.

4. The method of claim 2 wherein said carbon black in said dispersion mixture is hydrophilic.

5. The method of claim 2 wherein said at least one stabilizing substance is selected from the group consisting of chlorofluorocarbons, polychlorotrifluoroethylene, polyvinyl alcohol, ethylene glycol, polyethylene glycol alkyl ether, polyoxyethylene, on-ionic surfactants, primary alcohol alkoxylates, polyoxyethylene sorbitan mono-oleate, acrylic emulsions, sodium polyacrylate and naphthalene-formaldehyde condensate sulfonates.

6. The method of claim 1 wherein said first carbon black in said first dispersion mixture is hydrophobic.

7. The method of claim 6 wherein after said drying of said water-based, organic-free dispersion mixture on the web and before said sintering of said resulting electrode, a coat of a second water-based organic-free dispersion mixture containing a second carbon black is applied and then dried.

8. The method of claim 7 wherein said second carbon black of said second water-based, organic-free dispersion mixture is hydrophilic.

9. The method of claim 7 wherein the second hydrophilic carbon black is a support for at least one member of the group consisting of platinum group metals, platinum group metal oxides, alloys and mixtures thereof.

10. The method of claim 9 wherein said first hydrophilic carbon black is a support for at least one of the groups consisting of platinum groups metals, platinum group metal oxides, alloys and mixtures thereof.

11. The method of claim 1 wherein said carbon black in said dispersion mixture is hydrophilic.

12. The method of claim 1 wherein said at least one stabilizing substance is selected from the group consisting of chlorofluorocarbons, polychlorotrifluoroethylene, polyvinyl alcohol, ethylene glycol, polyethylene glycol alkyl ether, polyoxyethylene, on-ionic surfactants, primary alcohol alkoxylates, polyoxyethylene sorbitan mono-oleate, acrylic emulsions, sodium polyacrylate and naphthalene-formaldehyde condensate sulfonates.

* * * * *